United States Patent
Yamamoto et al.

(10) Patent No.: US 7,697,832 B2
(45) Date of Patent: Apr. 13, 2010

(54) IMAGING APPARATUS AND LENS MOVEMENT CONTROL METHOD

(75) Inventors: Shinya Yamamoto, Higashiyamato (JP); Masaki Kuroiwa, Hamura (JP)

(73) Assignee: Casio Hitachi Mobile Communications Co., Ltd., Tokyo (JP)

( * ) Notice: Subject to any disclaimer, the term of this patent is extended or adjusted under 35 U.S.C. 154(b) by 517 days.

(21) Appl. No.: 11/603,397

(22) Filed: Nov. 21, 2006

(65) Prior Publication Data
US 2007/0116451 A1 May 24, 2007

(30) Foreign Application Priority Data
Nov. 22, 2005 (JP) ............................. 2005-337885

(51) Int. Cl.
*G03B 3/10* (2006.01)
*G03B 13/34* (2006.01)

(52) U.S. Cl. .................. 396/133; 359/824; 348/349

(58) Field of Classification Search ............. 396/90, 396/133; 359/824
See application file for complete search history.

(56) References Cited

U.S. PATENT DOCUMENTS

| 5,146,071 | A |   | 9/1992 | Ookubo et al. |
| 5,225,941 | A | * | 7/1993 | Saito et al. ............. 359/824 |
| 5,587,846 | A |   | 12/1996 | Miyano et al. |
| 2005/0128340 | A1 | * | 6/2005 | Ikeda ....................... 348/345 |
| 2006/0061234 | A1 | * | 3/2006 | Ito et al. .................. 310/317 |
| 2007/0031135 | A1 | * | 2/2007 | Ito .............................. 396/79 |

FOREIGN PATENT DOCUMENTS

| JP | 05-122579 | 5/1993 |
| JP | 05-216093 | 8/1993 |
| JP | 08-160287 | 6/1996 |
| JP | 11-098865 | 4/1999 |
| JP | 2000-028895 | 1/2000 |
| JP | 2000-147368 | 5/2000 |
| JP | 2002-095272 | 3/2002 |
| JP | 2003-322788 | 11/2003 |

(Continued)

OTHER PUBLICATIONS

English machine translation of Japanese Office Action for JP2005-337885, indicating how references cited in IDS dated Feb. 4, 2010 were applied.*

(Continued)

*Primary Examiner*—Melissa J Koval
*Assistant Examiner*—Leon W Rhodes
(74) *Attorney, Agent, or Firm*—Cohen Pontani Lieberman & Pavane LLP

(57) ABSTRACT

A camera has an infinity end stopper that stops a lens holder to a position which sets a best focal length at infinity, and a macro-side stopper that stops the lens holder to a position at which the best focal length becomes a predetermined length. In normal mode, the camera abuts the lens holder on the infinity end stopper and then moves the lens holder toward the macro-side stopper to perform auto focus. In macro mode, the camera abuts the lens holder on the macro-side stopper and then moves the lens holder toward the infinity end stopper to perform auto focus. This can suppress a variation in the position of the camera after lens movement.

6 Claims, 15 Drawing Sheets

FOREIGN PATENT DOCUMENTS

| | | |
|---|---|---|
| JP | 2004-004326 | 1/2004 |
| JP | 2004-205742 | 7/2004 |
| JP | 2005-057839 | 3/2005 |
| JP | 2005-077734 | 3/2005 |
| JP | 2005-086887 | 3/2005 |
| WO | WO 2005059615 A1 * | 6/2005 |

OTHER PUBLICATIONS

Search Report dated Mar. 8, 2007 issued for European Patent Application No. 06 02 3743.

* cited by examiner

FIG. 4A  VA  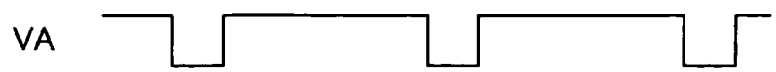
FIG. 4B  VB  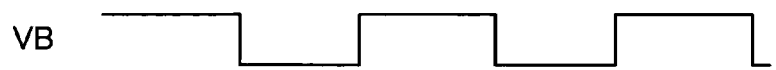
FIG. 4C  VC  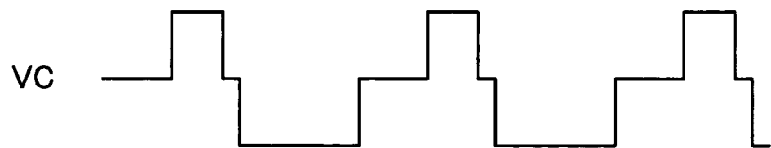

IMAGING APPARATUS AND LENS MOVEMENT CONTROL METHOD

BACKGROUND OF THE INVENTION

1. Field of the Invention

The present invention relates to an imaging apparatus and a lens movement control method.

2. Description of the Related Art

Recently, as typified by cellular phones, mobile devices with a built-in camera as an imaging apparatus are rapidly becoming popular. There is an increasing number of cameras each to be built in a mobile device, which have an auto focus mechanism. Because miniaturization is a prerequisite in mobile devices, the miniaturization of the auto focus mechanism is desired.

Conventionally, a stepping motor as a lens drive motor is used to do auto focusing. An auto focus mechanism using the stepping motor needs to convert the torque of the motor into the movement of a lens, making miniaturization difficult.

There are methods which do not use an electromagnetic motor like a stepping motor. One example of such methods drives a lens by an ultrasonic motor used by, for example, a single-lens reflex camera, as disclosed in Unexamined Japanese Patent Application KOKAI publication No. 2005-57839.

However, because the ultrasonic motor employs a mechanism which generates ultrasonic vibration by a plurality of piezoelectric elements, miniaturization and cost reduction are difficult.

As a lens moving mechanism which overcomes the foregoing problem, there is a Smooth Impact Drive Mechanism (hereinafter, "SIDM") as disclosed in Unexamined Japanese Patent Application KOKAI publication No. 2002-95272 and Unexamined Japanese Patent Application KOKAI publication No. 2005-86887.

In the SIDM, as shown in FIG. 15, one end and the other end of a piezoelectric element 1 are respectively attached to a fixation member 2 and a drive shaft 3. A Flexible Print Circuit (hereinafter, "FPC") 4 is attached to the piezoelectric element 1, and a voltage is applied to the piezoelectric element 1 through the FPC 4. A lens holder 5 for fixing a lens is mounted on the drive shaft 3 or attached thereto in such a way that the drive shaft 3 penetrates the lens holder 5. The lens holder 5 moves along the drive shaft 3. The position of the lens is determined based on at what position in the drive shaft 3 the lens holder 5 is located. A best focal length which is a distance for best focusing changes in accordance with the position of the lens.

It is generally known that the piezoelectric element 1 expands and contracts as a voltage is applied. As a pulse voltage is repeatedly applied to the piezoelectric element 1 via the FPC 4, the piezoelectric element 1 expands and contracts based on the pulse voltage. Adjusting the rise speed of the pulse and the fall speed thereof can adjust the expansion and contraction speed of the piezoelectric element 1.

As the piezoelectric element 1 is slowly expanded, the lens holder 5 is displaced with the displacement of the piezoelectric element 1 because of friction between the lens holder 5 and the drive shaft 3. As the piezoelectric element 1 is rapidly contracted, the frictional part of the lens holder 5 slips because of the inertia, and the lens holder 5 remains at almost the same position. By repeating expansion and contraction, the lens is displaced by a long stroke.

As the foregoing operation is performed reversely, the lens can be moved in the opposite direction.

In the case of auto focusing, the camera moves the lens to plural points within a desired focus range by controlling the lens moving mechanism, finds out the best focus lens position where the best focus is set to an imaging target from image information obtained at each point, and moves the lens to that position. The method of finding the best focus lens position is disclosed in Unexamined Japanese Patent Application KOKAI publication No. H5-122579.

When the lens is moved to set the best focus to the imaging target, a lens position (reference position) to be a reference where a focal position is specified beforehand is necessary to figure out a current lens position. Thus, when the lens is mounted on the camera, a stopper which stops the lens holder 5 at a position over the drive shaft 3 where the best focal length becomes infinite (hereinafter, this position is called "infinity end") is set up, and this infinity end is taken as a reference position. The reference position may not be the infinity end, but may be set to a position where the best focal length is 1.4 m or a position where the best focal length is 1 m, both positions being shifted from the infinity end by specified number of pulses.

In the SIDM, pulse control is performed, and the movement of the lens holder 5 is controlled by the number of pulses or a time when pulses are applied. In moving the lens holder 5 to a desired position, first, the lens holder 5 is moved until it hits the stopper which serves as the reference position. From this position, a pulse voltage having a necessary number of pulses for the lens holder 5 to move to the desired position is applied to the piezoelectric element 1, or a pulse voltage is applied to the piezoelectric element 1 for a time necessary for the lens holder 5 to move to the desired position.

In the SIDM, however, the movement of the lens is performed by the friction between the lens holder 5 and the drive shaft 3 and reciprocation, raising a problem such that the moving speed of the lens varies. For example, even if the average moving speed of the lens is 3.75 mm/sec, the moving speed varies from the minimum (2.2 mm/sec) to the maximum (5.3 mm/sec) at a normal temperature. As the moving speed of the lens holder 5 on which the lens is mounted varies, the moving distance of the lens holder 5 varies even if the pulse voltage is applied to the piezoelectric element 1 by the specified number of pulses, or for the specified time. Accordingly, it is difficult to move the lens to the desired position. In particular, in macro shooting in which the moving distance of the lens holder 5 from the infinity end becomes large, a variation in moving distance becomes extremely large, making it difficult to control the moving distance by the pulse voltage.

SUMMARY OF THE INVENTION

Accordingly, it is an object of the present invention to provide an imaging apparatus and a lens movement control method which can suppress a positional variation after a lens is moved.

To achieve the object, an imaging apparatus that picks up an image input via a lens according to the first aspect of the invention comprises:

a moving unit that moves the lens along a drive shaft in a direction to make shorter a best focal length where a best focus is set to an imaging target and in a direction to make the best focal length longer;

a first stopper that inhibits the lens from moving along the drive shaft in the direction to make the best focal length longer; and a second stopper that is located at a position apart from the first stopper and inhibits the lens present between the first stopper and the second stopper from moving in the direction to make the best focal length shorter.

To achieve the object, according to the second aspect of the invention, there is provided a lens movement control method for an imaging apparatus that picks up an image input via a lens and having a moving unit that moves the lens along a drive shaft in a direction to make shorter a best focal length where a best focus is set to an imaging target and in a direction to make the best focal length longer, a first stopper that inhibits the lens from moving along the drive shaft in the direction to make the best focal length longer, and a second stopper that is located at a position apart from the first stopper and inhibits the lens present between the first stopper and the second stopper from moving in the direction to make the best focal length shorter. The method includes:

a first process step where when imaging is performed in a first imaging mode, movement of the lens is stopped by the first stopper, and the lens is moved from a reference position at which the movement is stopped by a desired amount in the direction to make the best focal length shorter; and a second process step where when imaging is performed in a second imaging mode to ensure closer imaging than the first imaging mode, movement of the lens is stopped by the second stopper, and the lens is moved from a reference position at which the movement is stopped by a desired amount in the direction to make the best focal length longer.

According to the invention, it is possible to suppress a positional variation after the lens is moved. In particular, at the time of, for example, macro shooting which enables close-up, the moving distance of the lens can be shortened to shorten the shooting time, and the positional variation after lens movement can be suppressed.

BRIEF DESCRIPTION OF THE DRAWINGS

These objects and other objects and advantages of the present invention will become more apparent upon reading of the following detailed description and the accompanying drawings in which:

FIGS. 4A to 4C are explanatory diagrams for a pulse voltage applied to a piezoelectric element;

DETAILED DESCRIPTION OF THE PREFERRED EMBODIMENT

An embodiment of the present invention will be described in detail below with reference to the accompanying drawings.

Figure 1:
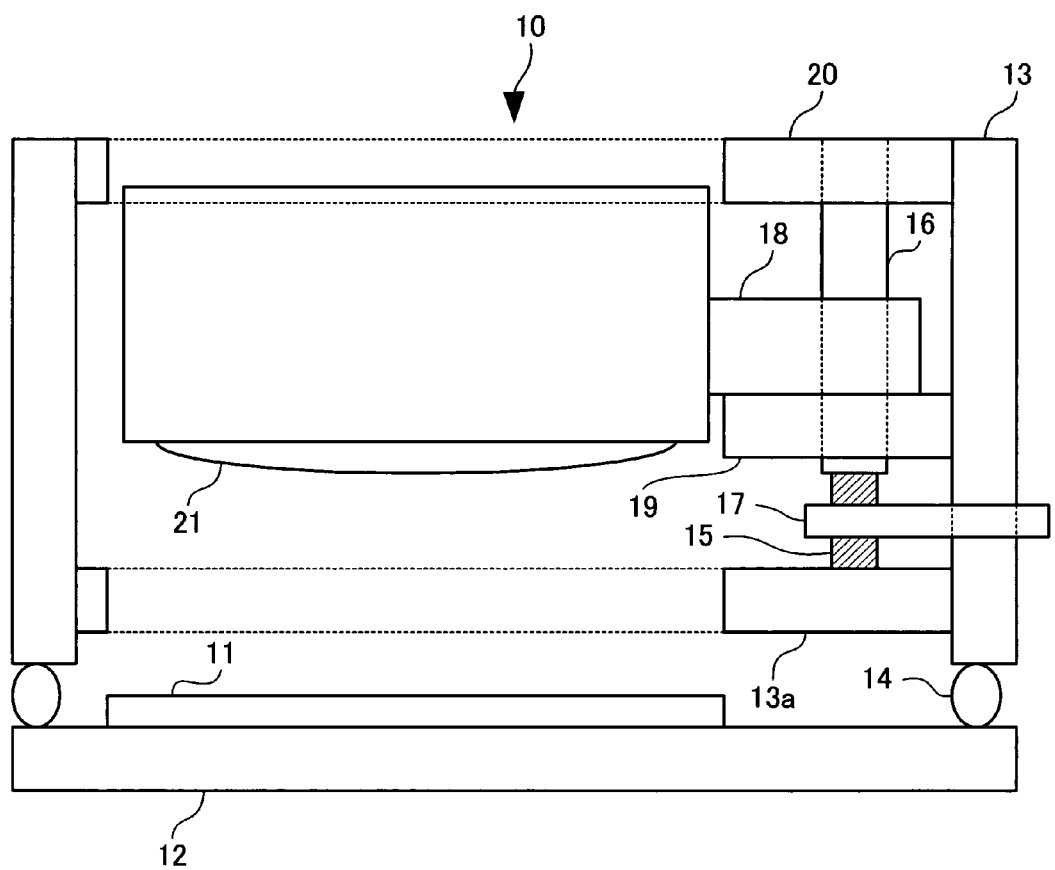
FIG. 1 is a diagram showing a part of a camera according to an embodiment of the invention.

FIG. 1 is a diagram showing a part of a camera 10 according to the embodiment of the invention.

Figure 2:
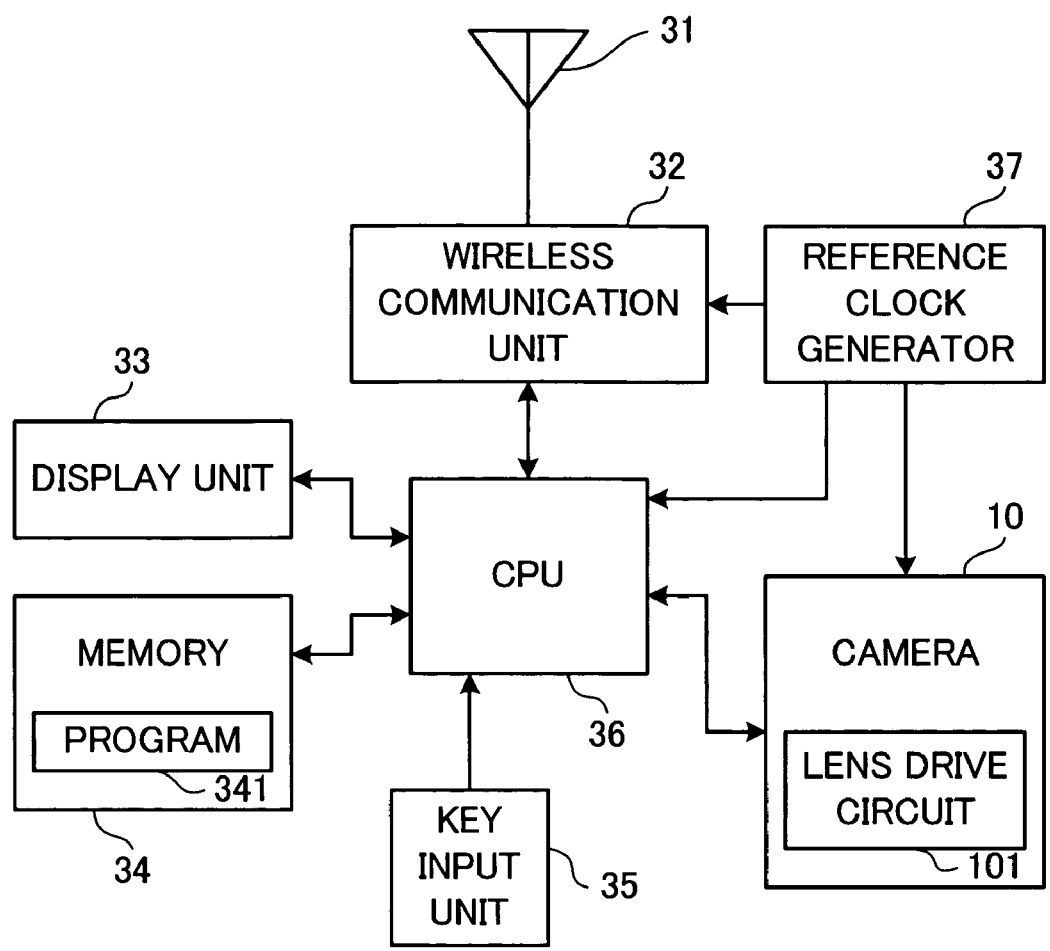
FIG. 2 is a configuration diagram of a cellular phone equipped with the camera in FIG. 1.

FIG. 2 is a configuration diagram of a cellular phone equipped with the camera 10 in FIG. 1.

Figure 3:
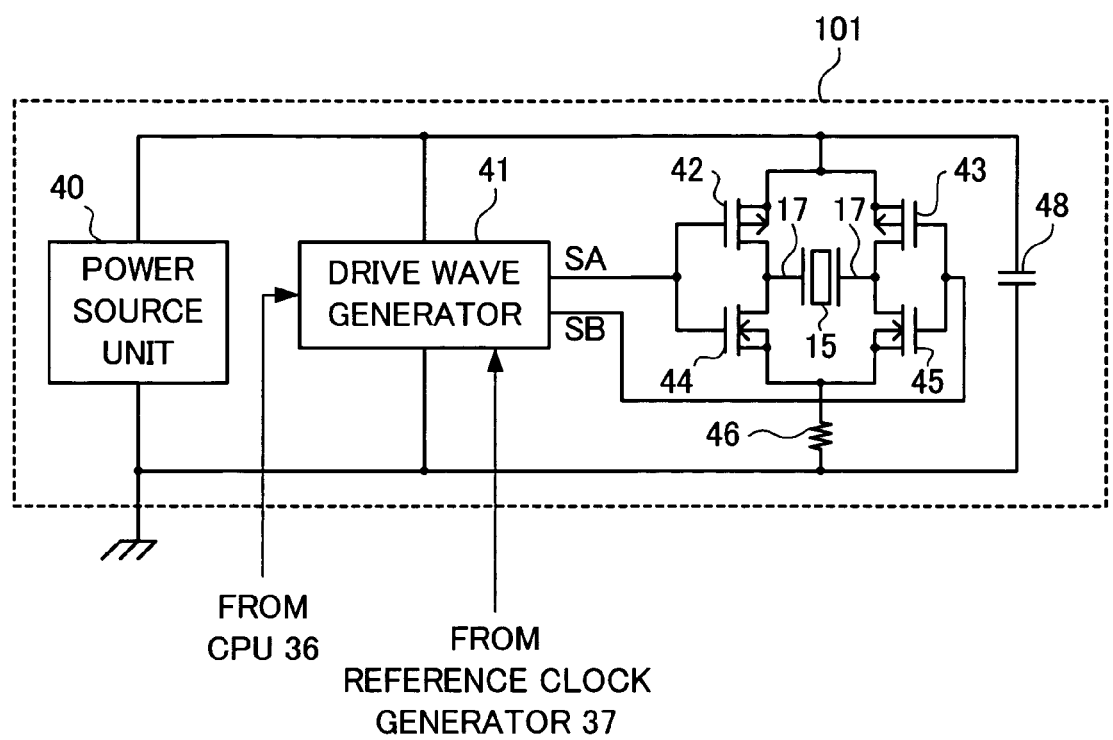
FIG. 3 is a circuit diagram showing a lens drive circuit that moves a lens holder in FIG. 1.

FIG. 3 is a circuit diagram showing a lens drive circuit 101 that moves a lens holder 18 in FIG. 1.

The camera 10 of the embodiment is mounted in a cellular phone as shown in FIG. 2 to enable the cellular phone to function as an imaging apparatus. As shown in FIG. 1, the camera 10 has an imaging device 11 which comprises a CMOS sensor or a CCD sensor. The imaging device 11 is mounted on one side of a ceramic board 12. The ceramic board 12 is adhered to a casing 13 by an adhesive 14 in such a way as to enclose the imaging device 11. The casing 13 has a plate 13a on the ceramic board (12) side. The plate 13a faces the ceramic board 12, and has an opening at a portion which corresponds to the imaging device 11. One end of a piezoelectric element 15 is attached to the opposite side of the plate 13a to the ceramic board 12, while the other end of the piezoelectric element 15 is attached to a drive shaft 16.

A flexible printed circuit (FPC) 17 is attached to either side face of the piezoelectric element 15, and a voltage is applied to the piezoelectric element 15 via the FPC 17. A lens holder 18 which secures a lens 21 is movably attached with the drive shaft 16 penetrating the lens holder 18. The lens holder 18 moves along the drive shaft 16. The position of the lens 21 is defined by where on the drive shaft 16 the lens holder 18 is positioned. The best focal length (the distance from the camera 10 which provides the best focus to an imaging target) changes according to the position of the lens 21.

Attached to the casing 13 are an infinity end stopper 19 and a macro-side stopper 20 which abut on the moving lens holder 18 to stop the movement thereof.

The infinity end stopper 19 stops the lens holder 18 at a position where the best focal length of the lens 21 becomes infinite, and is disposed near the ceramic board 12. The disposing position of the infinity end stopper 19 is set by operating the auto focusing (AF) before the infinity end stopper 19 is attached to the casing 13 to move the lens holder 18, and finding the position of the lens holder 18 where the best focal length becomes infinite. The infinity end stopper 19 is adhered to the casing 13 in such a way that the lens holder 18 does not move toward the ceramic board 12 from the set position any more. As will be discussed later, the position of the infinity end stopper 19 becomes an infinity-end reference position in normal mode for normal shooting.

As the infinity end stopper 19 is fixed to the casing 13, a lens position in macro mode for macro shooting is specified from the optical characteristic of the lens 21. Thus, a position where the best focal length of the lens 21 becomes, for example, predetermined 8 cm is acquired by calculation or the like from the optical characteristic of the lens 21. The macro-side stopper 20 is adhered to the casing 13 in such a way that the lens 21 mounted on the lens holder 18 stops at the acquired position. The macro-side stopper 20 is disposed at a position more apart from the ceramic board 12 than the infinity end stopper 19. The position of the macro-side stopper 20 becomes a macro-side reference position in macro mode for close-up shooting.

The infinity end stopper 19 and the macro-side stopper 20 may be disposed in the casing 13 before the ceramic board 12 is adhered to the casing 13. For example, when the casing 13 is formed by molding or the like, the infinity end stopper 19 and the macro-side stopper 20 may be formed simultaneously, and then the ceramic board 12 may be adhered to the casing 13 in such a way that the best focal length becomes infinite with the lens holder 18 abutting on the infinity end stopper 19.

As shown in FIG. 2, the cellular phone on which the camera 10 in FIG. 1 is mounted has an antenna 31, a wireless communication unit 32 connected to the antenna 31, a display unit 33 for display, a memory 34, a key input unit 35 including various keys, a CPU 36 controlling those units and camera 10, and a reference clock generator 37. As the CPU 36 controls the camera 10, the cellular phone shown in FIG. 2 functions as an imaging apparatus.

The reference clock generator 37 is a circuit which generates a clock signal, which is supplied to the camera 10, the wireless communication unit 32, and the CPU 36.

The imaging device 11 of the camera 10 outputs a signal corresponding to a picked-up image to the CPU 36 in response to a control signal supplied from the CPU 36. The memory 34 stores a program 341 to be used by the CPU 36 and an image picked up by the camera 10.

The camera 10 has a lens drive circuit (lens driver) 101 for moving the lens holder 18. The lens drive circuit 101 is structured as shown in FIG. 3.

The lens drive circuit 101 has a power source unit 40, a drive wave generator 41, two P-channel type MOS transistors (hereinafter, "PMOS") 42, 43, two N-channel type MOS transistors (hereinafter, "NMOS") 44, 45, a resistor 46, and a capacitor 48.

The power source unit 40 is commonly used by the various units of the cellular phone and the lens drive circuit 101. The power source unit 40 has a negative electrode grounded, and generates a supply voltage Vcc from a positive electrode thereof.

The drive wave generator 41 is connected between the positive electrode and the negative electrode of the power source unit 40 and is supplied with power. The control signal from the CPU 36 and the clock signal from the reference clock generator 37 are input to the drive wave generator 41. The drive wave generator 41 generates a drive signal SA for driving the gates of the PMOS 42 and the NMOS 44, and a drive signal SB for driving the gates of the PMOS 43 and the NMOS 45 based on the control signal supplied from the CPU 36 and the clock signal supplied from the reference clock generator 37.

The source and drain of the PMOS 42 are respectively connected to the positive electrode of the power source unit 40 and the drain of the NMOS 44. The source and drain of the PMOS 43 are respectively connected to the positive electrode of the power source unit 40 and the drain of the NMOS 45. The sources of the NMOS 44 and the NMOS 45 are connected to the negative electrode of the power source unit 40 through the resistor 46. The drive signal SA is supplied to the gates of the PMOS 42 and the NMOS 44, and the drive signal SB is supplied to the gates of the PMOS 43 and the NMOS 45.

The FPC 17 shown in FIG. 1 is connected to the node between the drain of the PMOS 42 and the drain of the NMOS 44, and is connected to one side face of the piezoelectric element 15. The FPC 17 is connected to the node between the drain of the PMOS 43 and the drain of the NMOS 45, and is connected to the other side face of the piezoelectric element 15. The capacitor 48 is connected between the positive electrode and the negative electrode of the power source unit 40 to suppress a change in supply voltage Vcc.

The PMOS 42 and the NMOS 44 are complementary turned on and off by the drive signal SA generated by the drive wave generator 41. When the PMOS 42 is turned on and the NMOS 44 is turned off, the supply voltage Vcc is applied to the one side face of the piezoelectric element 15. When the PMOS 42 is turned off and the NMOS 44 is turned on, the one side face of the piezoelectric element 15 is set to the ground potential.

The PMOS 43 and the NMOS 45 are complementary turned on and off by the drive signal SB generated by the drive wave generator 41. When the PMOS 43 is turned on and the NMOS 45 is turned off, the supply voltage Vcc is applied to the other side face of the piezoelectric element 15. When the PMOS 43 is turned off and the NMOS 45 is turned on, the other side face of the piezoelectric element 15 is set to the ground potential.

Applied to the piezoelectric element 15 is a difference between a voltage VA output from the PMOS 42 and the NMOS 44, and a voltage VB output from the PMOS 43 and the NMOS 45. The voltage VA is periodically changed as shown in FIG. 4A and the voltage VB is periodically changed as shown in FIG. 4B by the drive signals SA and SB generated by the drive wave generator 41. As the voltage VA and the voltage VB change periodically, a periodical pulse voltage VC is applied to the piezoelectric element 15 as shown in FIG. 4C. The rise time of the pulse voltage VC and the fall time thereof are variable in accordance with the way of supplying the drive signals SA and SB.

As the pulse voltage VC is repeatedly applied to the piezoelectric element 15 through the FPC 17, the piezoelectric element 15 expands and contracts based on the pulse voltage VC. Because of the expansion and the contraction, the drive shaft 16 vibrates, and this vibration moves the lens holder 18 shown in FIG. 1.

As the piezoelectric element 15 is slowly expanded, the lens holder 18 is displaced with the displacement of the piezoelectric element 15 because of the friction between the lens holder 18 and the drive shaft 16. As the piezoelectric element 15 is rapidly contracted, the frictional part of the lens holder 18 slips because of the inertia, and the lens holder 18 remains at almost the same position. By repeating expansion and contraction, the lens 21 is displaced by a long stroke.

As the foregoing operation is performed reversely, the lens 21 can be moved in the opposite direction.

Next, a process of an auto focus control will be explained.

In the auto focusing of the camera 10 of the embodiment, two shooting modes can be set: a "normal mode" for shooting an object whose distance from the camera 10 is 30 cm or so to infinity, and a "macro mode" for shooting an object whose distance from the camera 10 is 10 cm or so to 20 cm or so can be set. The separation of the scan range over which the lens 21 is moved for auto focusing into two shortens the time until the auto focusing is focused.

Figure 5:
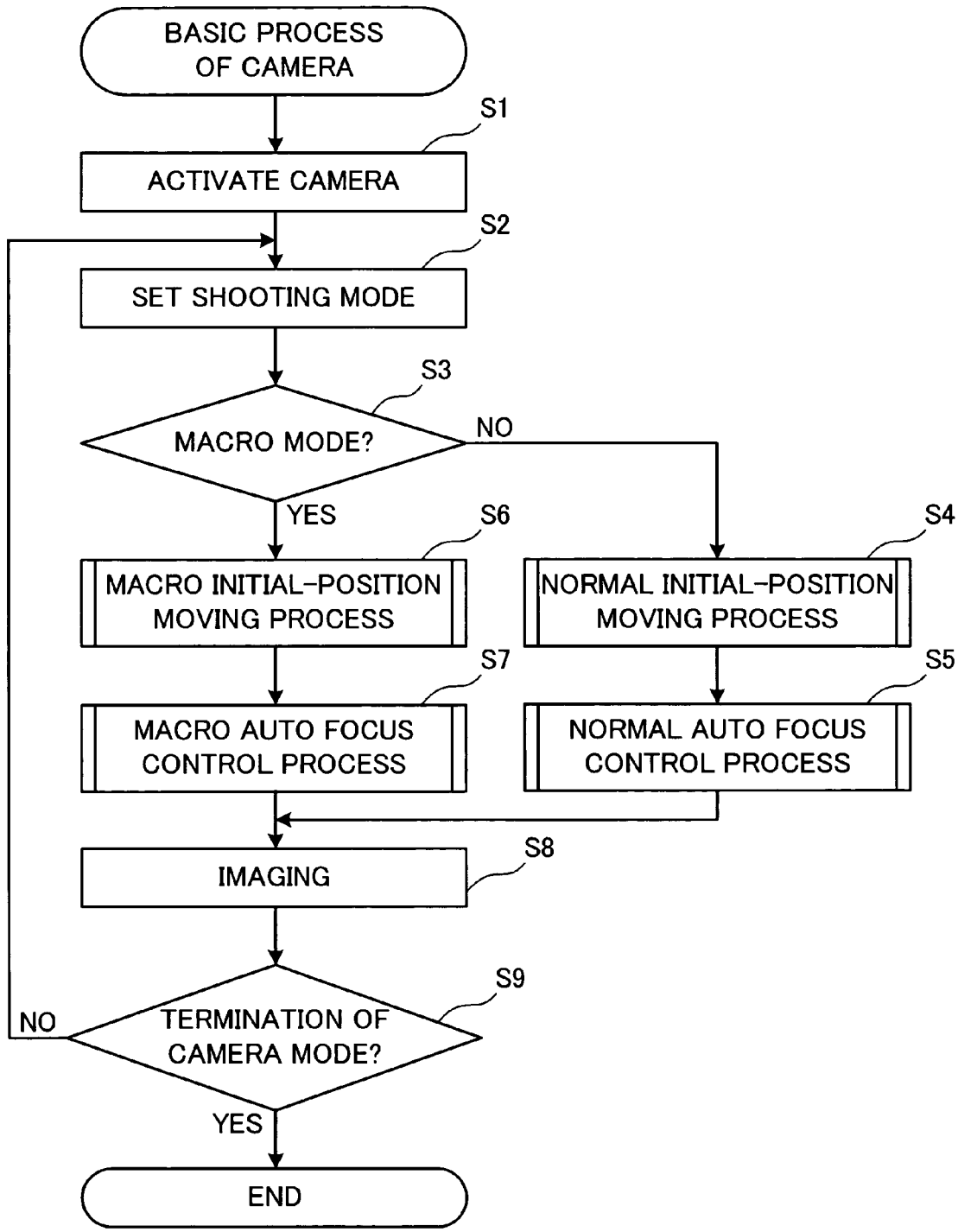
FIG. 5 is a flowchart showing a basic process of the camera according to the embodiment of the invention.

The basic process of the camera 10 according to the embodiment of the invention is shown in FIG. 5. The basic process is executed as the CPU 36 controls the camera 10 in accordance with the program 341 stored in the memory 34. When the cellular phone is set to a camera mode for camera shooting, the camera 10 is activated (step S1). When the camera 10 is activated, the CPU 36 prompts the user to set a shooting mode. The default setting of the shooting mode is the normal mode. As the user selects the shooting mode with the key input unit 35 to set the shooting mode (step S2), the CPU 36 determines whether the shooting mode is the macro mode or not (step S3).

When the shooting mode is not the macro mode (step S3: NO), which means that the shooting mode is the normal mode, a normal initial-position moving process (step S4) and a normal auto focus control process (step S5) are executed.

When the shooting mode is the macro mode (step S3: YES), a macro initial-position moving process (step S6) and a macro auto focus control process (step S7) are executed. The macro initial-position moving process and the macro auto focus control process will be explained in detail later.

When the normal auto focus control process in step S5 or the macro auto focus control process in step S7 is terminated, imaging is performed (step S8). After the imaging, the CPU 36 determines whether the camera mode is terminated (step S9). When no instruction of stopping the camera function has been given and the camera mode is not terminated (step S9: NO), the process returns to step S2. When the instruction of stopping the camera function has been instructed, and the camera mode is terminated (step S9: YES), the process in the camera mode is terminated.

The above-described process is the basic process of the camera.

Figure 6:
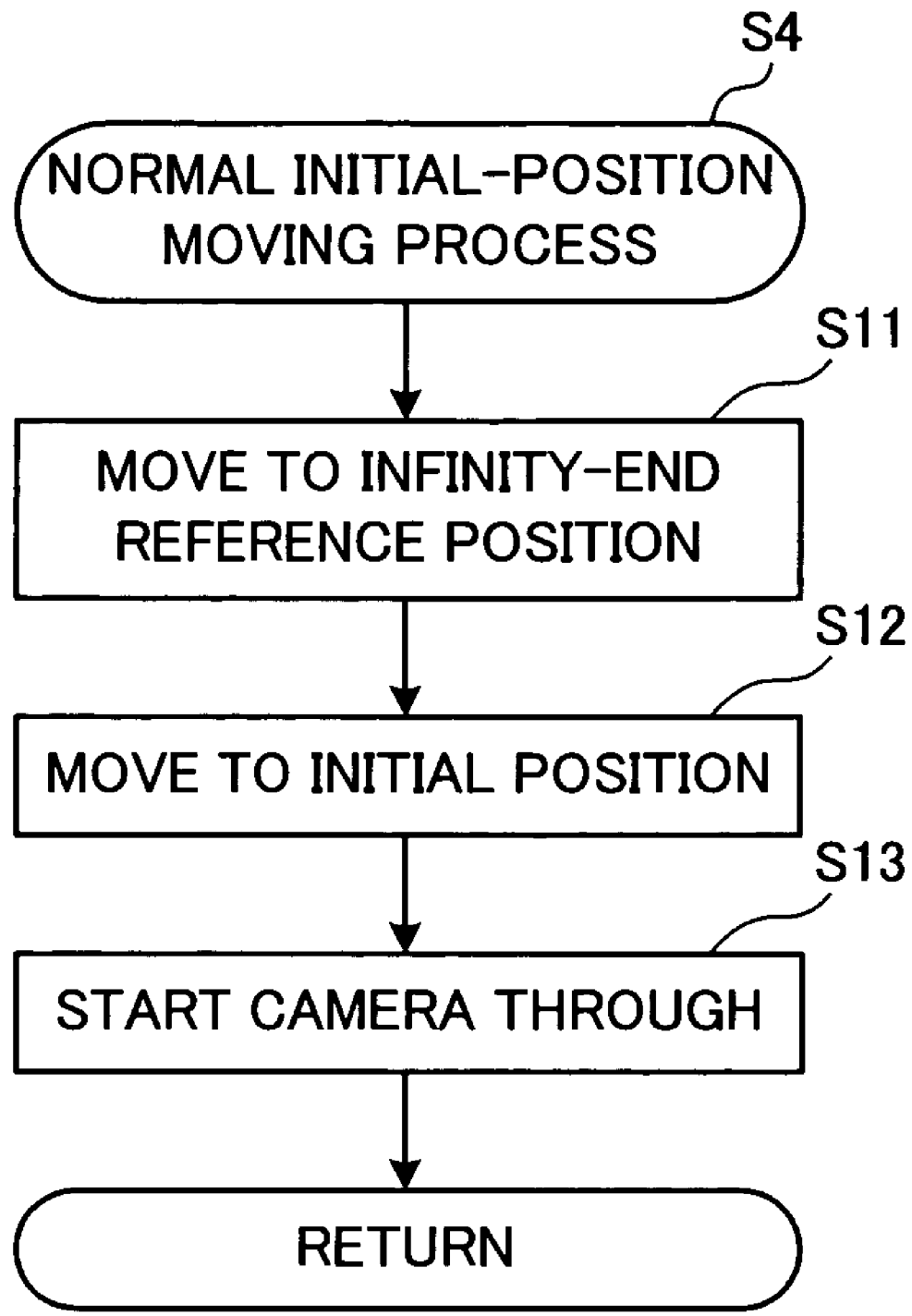
FIG. 6 is a flowchart showing a normal initial-position moving process in FIG. 5.

Next, the normal initial-position moving process which is the process at step S4 in the basic process of the camera shown in FIG. 5 will be explained. FIG. 6 is a flowchart showing the process contents of the normal initial-position moving process.

First, the CPU 36 moves the lens holder 18 to an infinity-end reference position (step S11). Specifically, because at which position the lens 21 is located is unknown, the CPU 36 continuously applies the pulse voltage VC to the piezoelectric element 15 to move the lens holder 18 having the lens 21 built therein in an infinite direction in which the best focal length becomes long (direction toward the ceramic board 12). The presence of the infinity end stopper 19 in the infinite direction inhibits the lens holder 18 from further moving after contacting the infinity end stopper 19. Therefore, no matter which position the lens is located when the normal initial-position moving process is started, the lens 21 and the lens holder 18 move to the infinity end stopper 19 which is the infinity-end reference position, thereby specifying the lens position.

At this time, the CPU 36 applies the pulse voltage VC to the piezoelectric element 15 for a predetermined time sufficient to move the lens holder 18 from an arbitrary position on the drive shaft to the infinity-end reference position, so that the lens holder 18 moves to the infinity-end reference position. In this respect, the CPU 36 waits for the passage of the predetermined time sufficient for the completion of the movement.

After that, the CPU 36 moves the lens 21 to an initial position in normal mode (normal initial position) (step S12). Specifically, the CPU 36 set the normal initial position with the infinity-end reference position taken as a reference, and moves the lens 21 and the lens holder 18 to the set position. The CPU 36 moves the lens holder 18 by specified pulses in a macro direction in which the best focal length becomes short (direction away from the ceramic board 12), and moves the lens 21 to a position which utilizes the depth of field and facilitates a finder to be used in normal mode (for example, a position where the best focal length becomes 1.4 m or so). After the lens 21 is moved to the initial position, the CPU 36 starts camera through for outputting an image input from the camera 10 to the display unit 33 (step S13).

The above-described process is the normal initial-position moving process.

Figure 7:
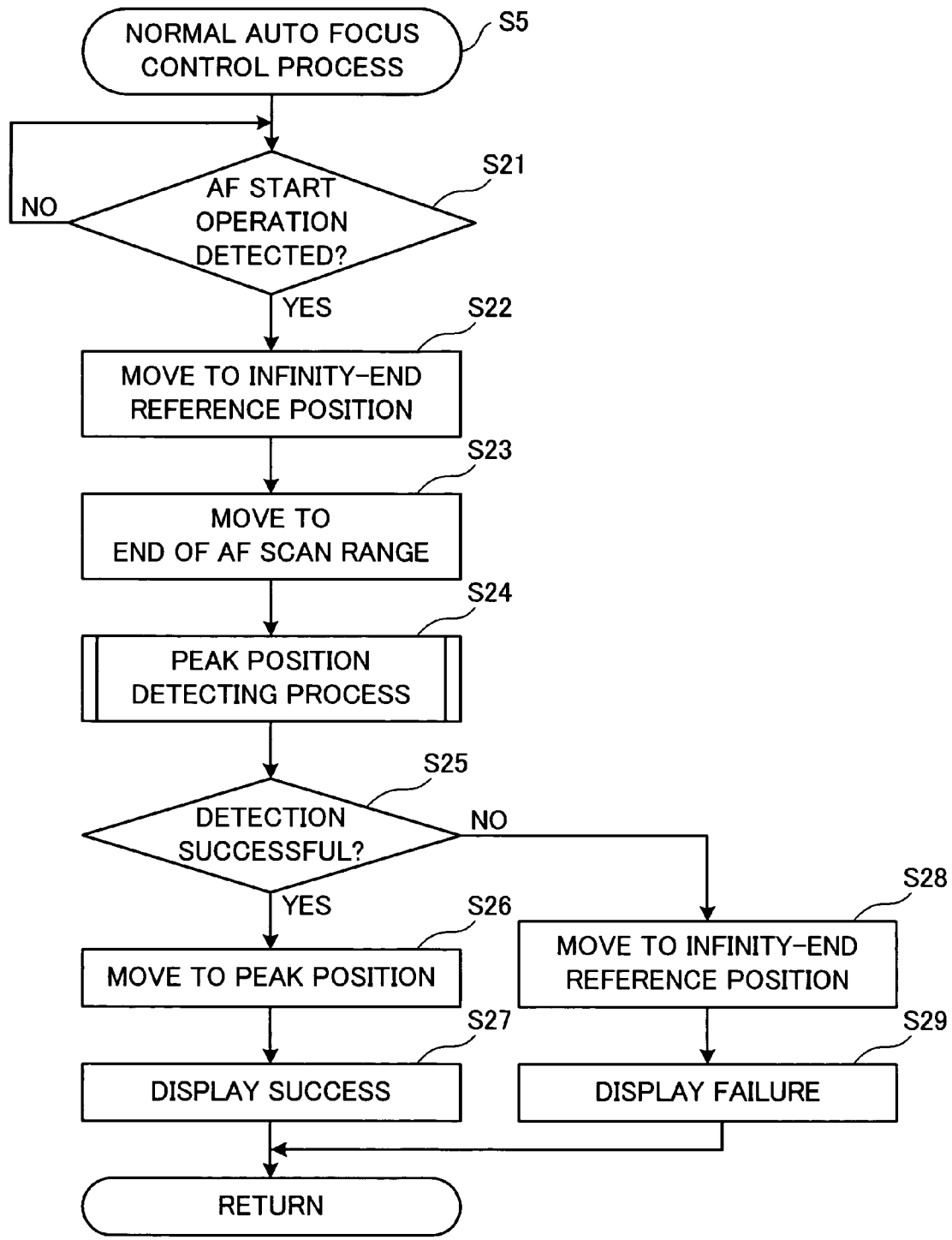
FIG. 7 is a flowchart showing a normal auto focus control process in FIG. 5.

Next, the normal auto focus control process which is the process at step S5 in the basic process of the camera shown in FIG. 5 will be explained. FIG. 7 is a flowchart showing the process contents of the normal auto focus control process.

First, the CPU 36 determines whether an operation of starting the auto focusing (AF) by the user has been detected (step S21). When the AF start operation is not detected (step S21: NO), the CPU 36 stands by until the operation is detected. As the user performs an operation of instructing the initiation of image capturing or AF, the CPU 36 detects the AF start operation (step S21: YES), and starts AF. In starting the AF, as done in step S11 in the foregoing normal initial-position moving process (FIG. 6), the CPU 36 moves the lens 21 and the lens holder 18 to the infinity-end reference position to specify the lens position (step S22). Specifically, the CPU 36 moves the lens holder 18 at the normal initial position for the camera through to the infinity-end reference position. The CPU 36 waits for the passage of a predetermined time sufficient for the completion of the movement.

Thereafter, the CPU 36 moves the lens holder 18 to the end of the AF scan range in normal mode (step S23). Specifically, the CPU 36 sets the position of the end of the scan range with the infinity-end reference position taken as a reference, and moves the lens 21 and the lens holder 18 to the set position. The CPU 36 moves the lens 21 and the lens holder 18 to the infinity end of the AF scan range in normal mode from the infinity-end reference position in the macro direction.

The CPU 36 sequentially moves the lens 21 and the lens holder 18 in the macro direction by predetermined distances within the scan range, and acquires images via the lens 21 and the imaging device 11 for the individual points to which the lens 21 and the lens holder 18 are moved. When the lens holder 18 moves to the macro-side end of the scan range, the CPU 36 detects a peak position based on the acquired images (step S24). Specifically, after the lens holder 18 moves to an AF end position in normal mode (position where the best focal length becomes, for example, 30 cm), the CPU 36 detects the peak position which provides the best focus from image information acquired at the individual points using the method disclosed in, for example, Unexamined Japanese Patent Application KOKAI publication No. H5-122579. The lens position that is appropriate for imaging the object is estimated from the peak position.

Figure 8:
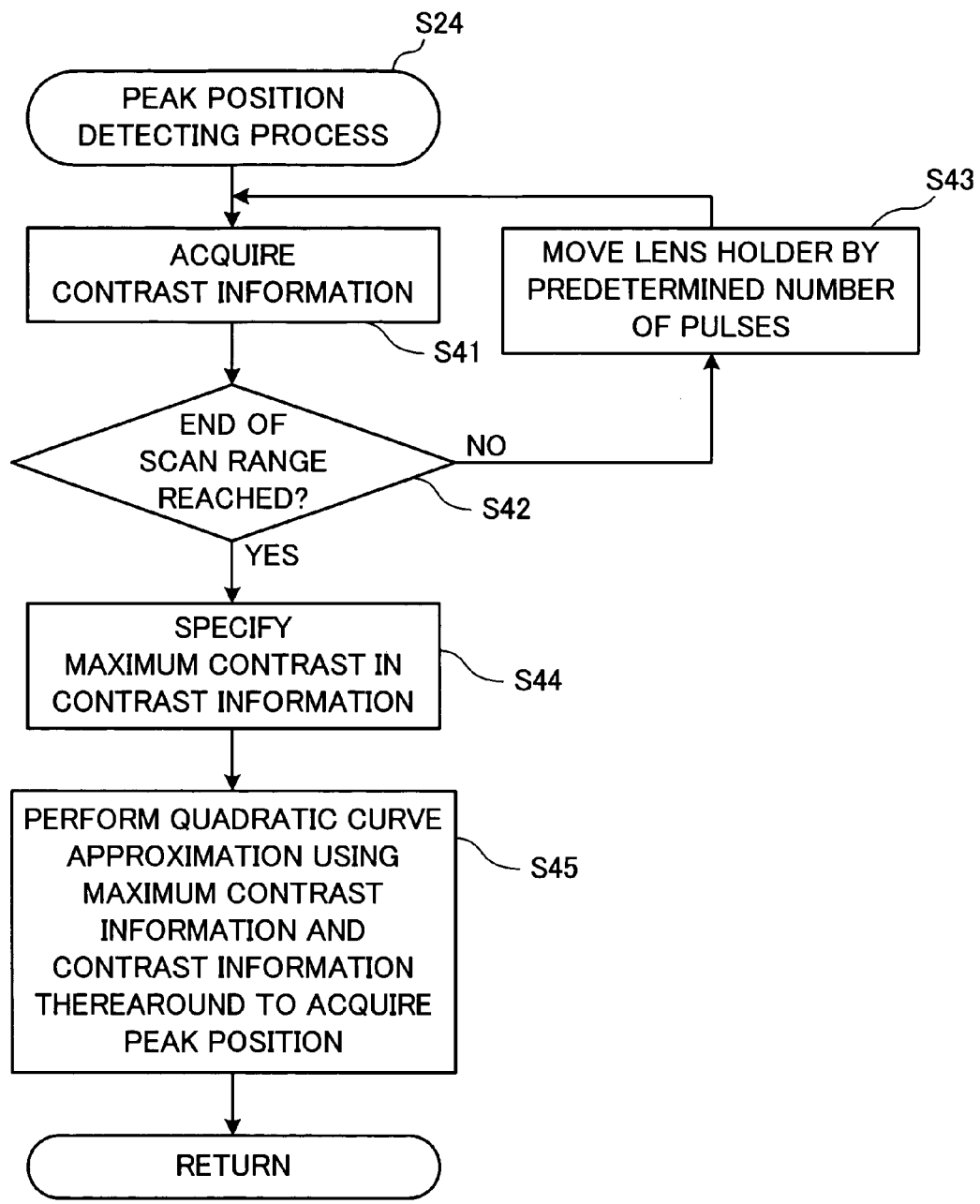
FIG. 8 is a flowchart showing the details of a peak position detecting process in FIG. 7.

The peak position detecting process in step S24 will be explained in detail. FIG. 8 is a flowchart showing the process contents of the peak position detecting process.

Every time the lens holder 18 moves within the AF scan range, the CPU 36 acquires contrast information from an obtained image (steps S41, S42, S43). Specifically, when the CPU 36 acquires contrast information at one point and records the contrast information in the memory 34 (step S41), the CPU 36 determines whether the lens holder 18 reaches the end of the scan range (step S42). When the lens holder 18 has not reached the end of the scan range (step S42: NO), the CPU 36 moves the lens holder 18 by a predetermined number of pulses (step S43), and returns to step S41 to acquire contrast information at the point to which the lens holder 18 is moved and record the contrast information in the memory 34.

When having determined that the lens holder 18 has reached the end of the scan range (step S42: YES), the CPU 36 specifies a maximum contrast from the acquired plural pieces of contrast information (step S44).

The CPU 36 specifies the lens position which provides the maximum contrast information, and reads contrast information of images acquired at lens positions around the specified lens position from the memory 34. Then, the CPU 36 performs quadratic curve approximation using the maximum contrast information and the read contrast information therearound to acquire, as a peak position, a lens position which provides a peak contrast (step S45). This process detects a peak position providing the best focus using the fact that highest contrast information is acquired from the lens position which provides the best focus.

The foregoing process is the peak position detecting process.

Turning back to FIG. 7, when the peak position detecting process (step S24) ends, the CPU 36 determines based on the process result whether detection of a peak position has been successful (step S25).

When the detection of a peak position has been successful (step S25: YES), the CPU 36 moves the lens 21 and the lens holder 18 to the peak position (step S26), and displays the success of AF on the display unit 33 (step S27).

When the detection of a peak position has failed (step S25: NO), the CPU 36 moves the lens 21 and the lens holder 18 to the infinity-end reference position (step S28), and displays the failure of AF on the display unit 33 (step S29).

The above-described process is the normal auto focus control process.

Figure 9:
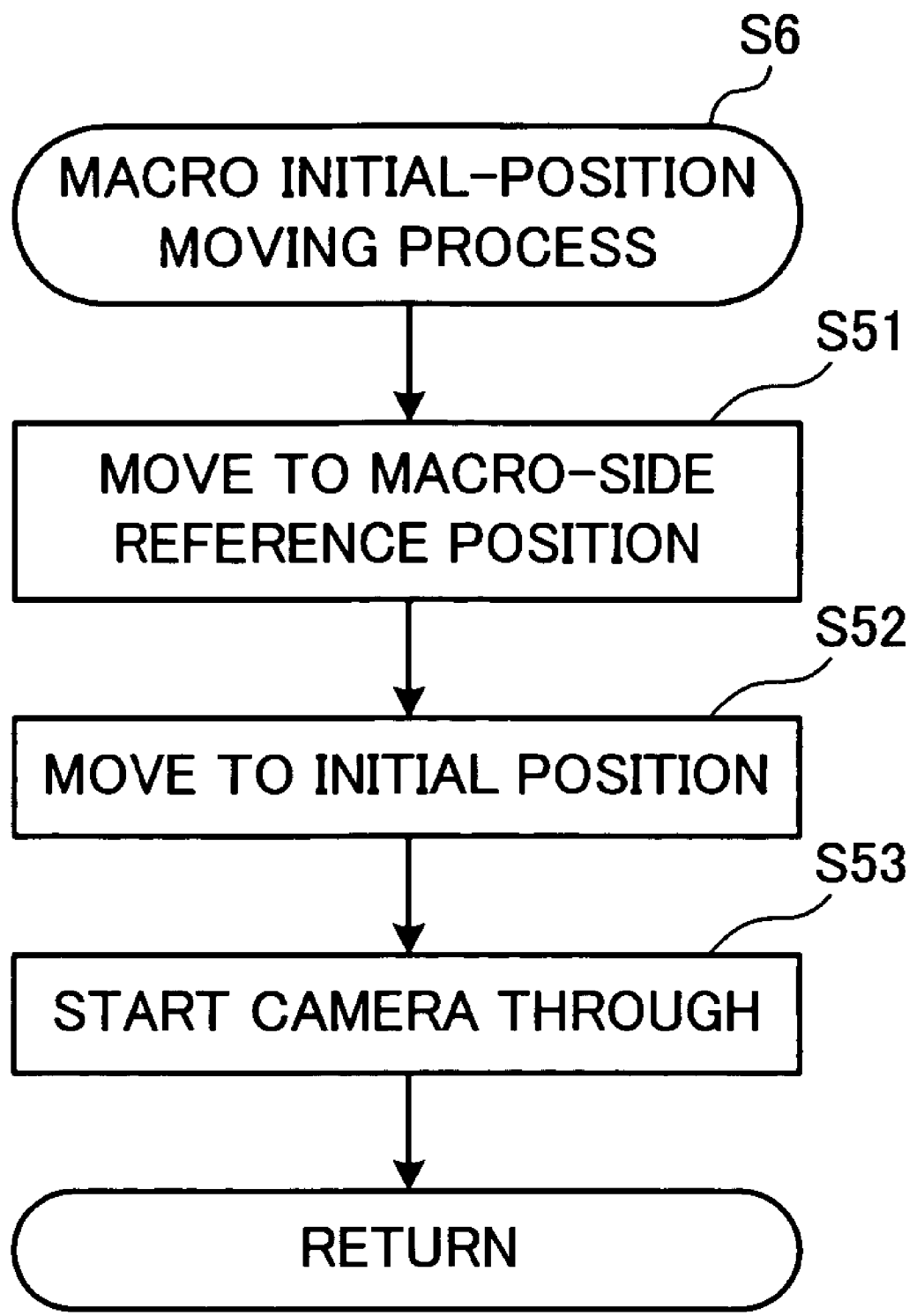
FIG. 9 is a flowchart showing a macro initial-position moving process in FIG. 5.

Next, the macro initial-position moving process which is the process at step S6 in the basic process of the camera shown in FIG. 5 will be explained in detail. FIG. 9 is a flowchart showing the process contents of the macro initial-position moving process.

First, the CPU 36 moves the lens holder 18 to a macro-side reference position (step S51). Specifically, because at which position the lens 21 is located is unknown, the CPU 36 continuously applies the pulse voltage VC to the piezoelectric element 15 to move the lens holder 18 having the lens 21 built therein in a macro direction (direction away from the ceramic board 12). The presence of the macro-side stopper 20 in the macro direction inhibits the lens holder 18 from further moving after contacting the macro-side stopper 20. Therefore, no matter which position the lens is located when the macro initial-position moving process is started, the lens 21 and the lens holder 18 move to the macro-side stopper 20 which is the macro-side reference position, thereby specifying the lens position.

At this time, the CPU 36 applies the pulse voltage VC to the piezoelectric element 15 for a predetermined time sufficient to move the lens holder 18 from an arbitrary position on the drive shaft to the macro-side reference position, so that the lens holder 18 moves to the macro-side reference position. In this respect, the CPU 36 waits for the passage of the predetermined time sufficient for the completion of the movement.

Thereafter, the CPU 36 moves the lens 21 to an initial position in macro mode (macro initial position) (step S52). Specifically, the CPU 36 set the macro initial position with the macro-side reference position taken as a reference, and moves the lens 21 and the lens holder 18 to the set position. The CPU 36 moves the lens holder 18 by specified pulses in an infinite direction (direction toward the ceramic board 12), and moves the lens 21 to a position which utilizes the depth of field and facilitates a finder to be used in macro mode (for example, a position where the best focal length becomes 10 cm or so). After the lens 21 is moved to the initial position, the CPU 36 starts camera through for outputting an image input from the camera 10 to the display unit 33 (step S53).

The above-described process is the macro initial-position moving process.

Figure 10:
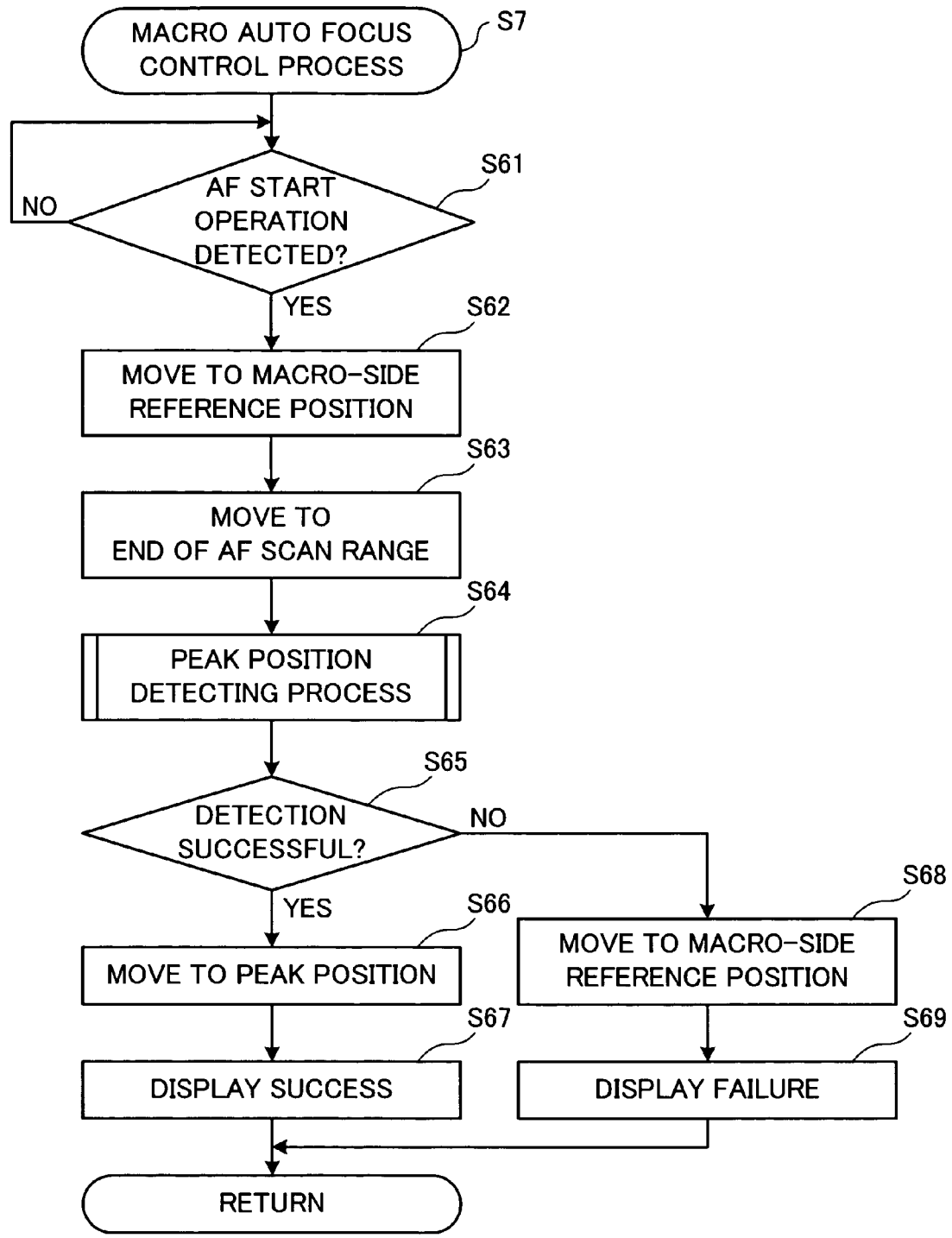
FIG. 10 is a flowchart showing a macro auto focus control process in FIG. 5.

Next, the macro auto focus control process which is the process at step S7 in the basic process of the camera shown in FIG. 5 will be explained in detail. FIG. 10 is a flowchart showing the process contents of the macro auto focus control process.

First, the CPU 36 determines whether an operation of starting AF by the user has been detected (step S61). When the AF start operation is not detected (step S61: NO), the CPU 36 stands by until the operation is detected. As the user performs an operation of instructing the initiation of image capturing or AF, the CPU 36 detects the AF start operation (step S61: YES), and starts AF. In starting the AF, as done in step S51 in the macro initial-position moving process (FIG. 9), the CPU 36 moves the lens 21 and the lens holder 18 to the macro-side reference position to specify the lens position (step S62). Specifically, the CPU 36 moves the lens holder 18 at the macro initial position for the camera through to the macro-side reference position. The CPU 36 waits for the passage of a predetermined time sufficient for the completion of the movement.

Thereafter, the CPU 36 moves the lens holder 18 to the end of the AF scan range in macro mode (step S63). Specifically, the CPU 36 sets the position of the end of the scan range with the macro-side reference position taken as reference, and moves the lens 21 and the lens holder 18 to the set position. The CPU 36 moves the lens 21 and the lens holder 18 to the macro-side end of the AF scan range in macro mode from the macro-side reference position in the infinite direction.

The CPU 36 sequentially moves the lens 21 and the lens holder 18 in the infinite direction by predetermined distances within the scan range, and acquires images via the lens 21 and the imaging device 11 for the individual points to which the lens 21 and the lens holder 18 are moved. When the lens holder 18 moves to the infinity end of the scan range, the CPU 36 detects a peak position based on the acquired images (step S64). Specifically, after the lens holder 18 is moved to the AF end position in macro mode (position where the best focal length becomes, for example, 20 cm), the CPU 36 detects the peak position which provides the best focus from image information acquired at the individual points through a process similar to, for example, the peak position detecting process shown in FIG. 8.

When the peak position detecting process (step S64) ends, the CPU 36 determines based on the process result whether detection of a peak position has been successful (step S65).

When the detection of a peak position has been successful (step S65: YES), the CPU 36 moves the lens 21 and the lens holder 18 to the peak position (step S66), and displays the success of AF on the display unit 33 (step S67).

When the detection of a peak position has failed (step S65: NO), the CPU 36 moves the lens 21 and the lens holder 18 to the macro-side reference position (step S68), and displays the failure of AF on the display unit 33 (step S69).

The above-described process is the macro auto focus control process.

As the camera 10 executes the processes shown in FIG. 5 to FIG. 10 explained above, an AF operation using a piezoelectric element can be realized.

Figure 11:
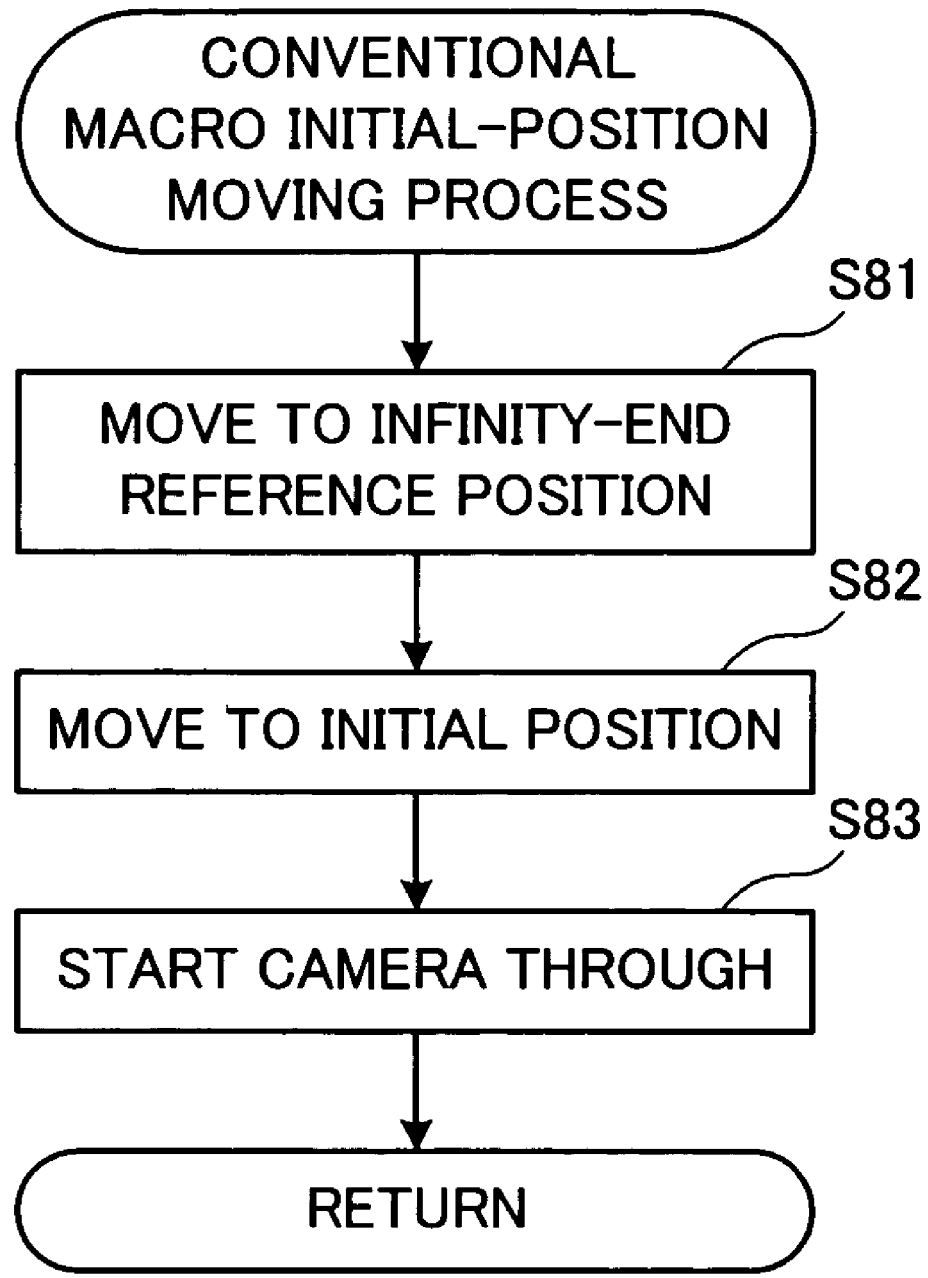
FIG. 11 is a flowchart showing a conventional macro initial-position moving process.
Figure 12:
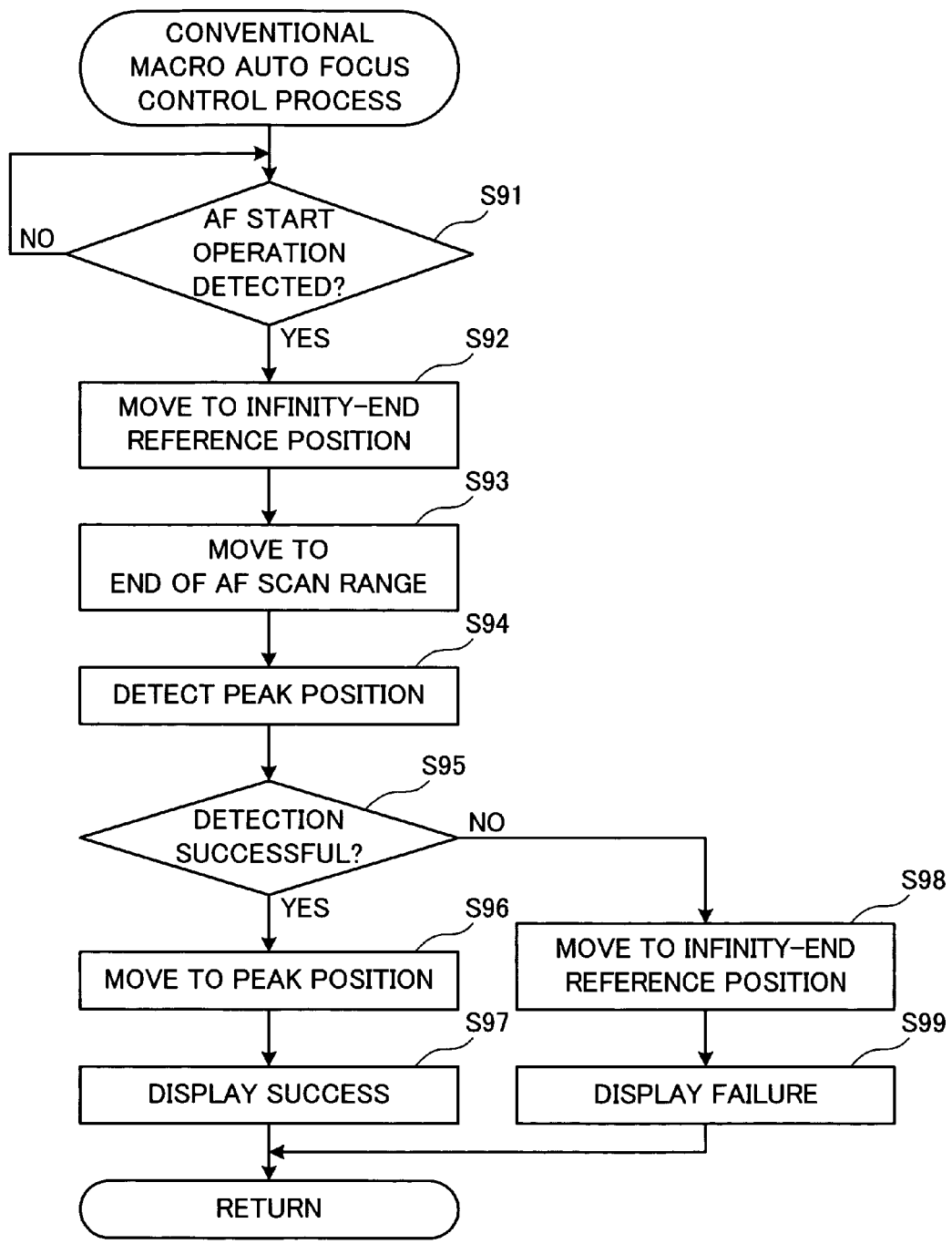
FIG. 12 is a flowchart showing a conventional macro auto focus control process.

A macro initial-position moving process and a macro auto focus control process which are executed by an ordinary camera which performs an AF operation using a piezoelectric element will be explained with reference to FIGS. 11 and 12.

To begin with, the macro initial-position moving process that is executed by the conventional camera will be explained. FIG. 11 is a flowchart showing the process contents of the conventional macro initial-position moving process.

First, the CPU 36 moves the lens holder 18 to an infinity-end reference position (step S81). Specifically, because at which position the lens 21 is located is unknown, the CPU 36 continuously applies the pulse voltage VC to the piezoelectric element 15 to move the lens holder 18 having the lens 21 built therein in the infinite direction. The presence of the infinity end stopper 19 in the infinite direction inhibits the lens holder 18 from further moving after contacting the infinity end stopper 19. Therefore, no matter which position the lens is located when the macro initial-position moving process is started, the lens 21 and the lens holder 18 move to the infinity end stopper 19 which is the infinity-end reference position, thereby specifying the lens position.

At this time, the CPU 36 applies the pulse voltage VC to the piezoelectric element 15 for a predetermined time sufficient to move the lens holder 18 from an arbitrary position on the drive shaft to the infinity-end reference position, so that the lens holder 18 moves to the infinity-end reference position. In this respect, the CPU 36 waits for the passage of the predetermined time sufficient for the completion of the movement.

Thereafter, the CPU 36 moves the lens 21 to the initial position in macro mode (macro initial position) (step S82). Specifically, the CPU 36 set the macro initial position with the infinity-end reference position taken as a reference, and moves the lens 21 and the lens holder 18 to the set position. The CPU 36 moves the lens holder 18 by specified pulses in the macro direction, and moves the lens 21 to a position which utilizes the depth of field and facilitates a finder to be used in macro mode (for example, a position where the best focal length becomes 10 cm or so). After the lens 21 is moved to the initial position, the CPU 36 starts camera through for outputting an image input from the camera 10 to the display unit 33 (step S83).

The above-described process is the macro initial-position moving process that is executed by the conventional camera.

Figure 13:
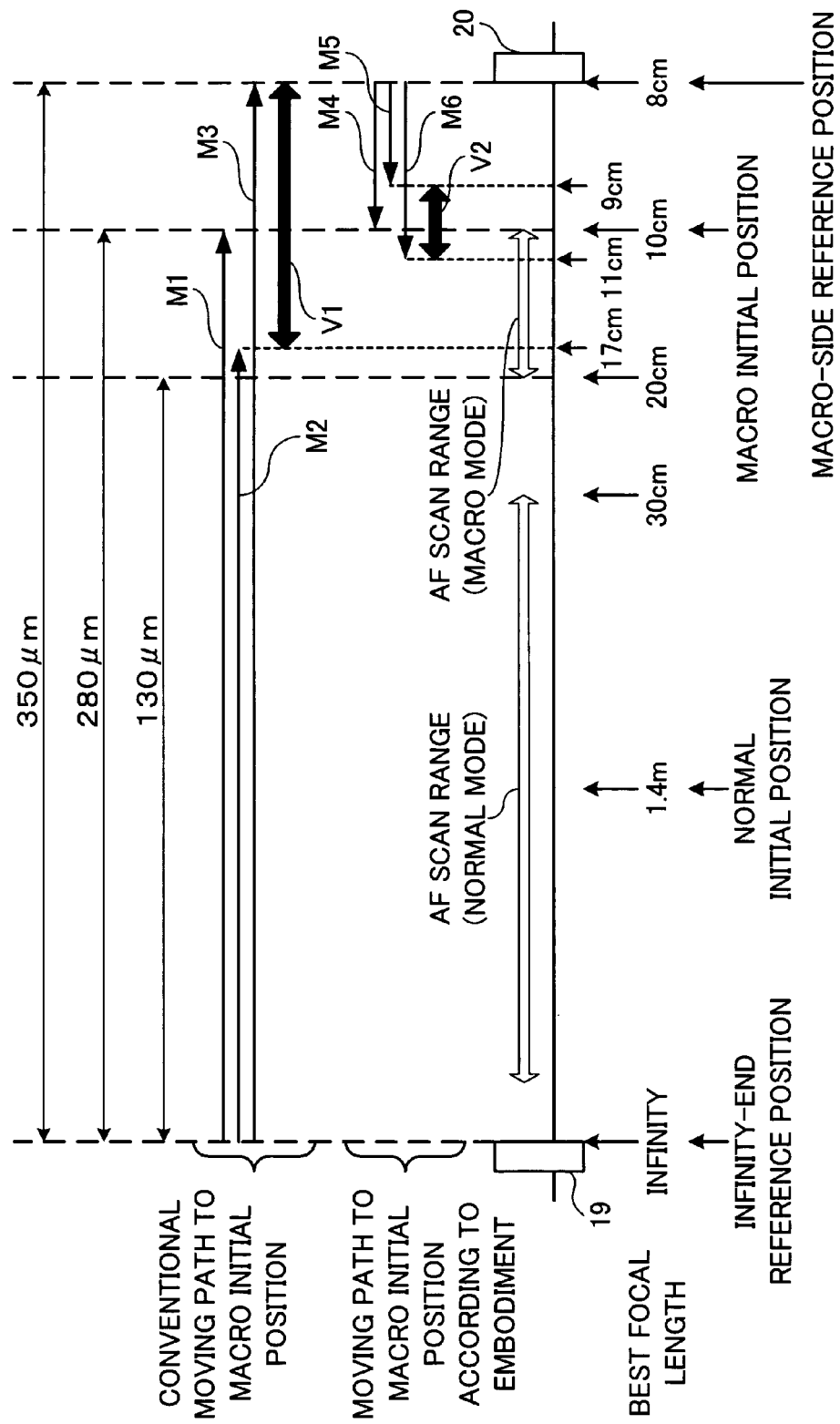
FIG. 13 is an explanatory diagram for an example of the movement path of a lens in the macro initial-position moving process.

The conventional macro initial-position moving process will be explained referring to an example of the moving path of the lens 21 shown in FIG. 13. As exemplified in FIG. 13, let the distance from the infinity end stopper 19 to the macro-side stopper 20 (the position where the best focal length becomes 8 cm) be 350 μm, the distance from the infinity end stopper 19 to the position where the best focal length becomes 10 cm be 280 μm, and the distance from the infinity end stopper 19 to the position where the best focal length becomes 20 cm be 130 μm. It is assumed that while the average moving speed of the lens is 3.75 mm/sec, the moving speed of the lens fluctuates from Min (2.2 mm/sec) to Max (5.3 mm/sec).

In the case of the average speed, when the pulse voltage VC of about 8300 pulses, for example, is applied to the piezoelectric element 15, the lens 21 reaches the macro initial position (the position where the best focal length is 10 cm) from the position of the infinity end stopper 19 (moving path M1).

With the moving speed being Min (2.2 mm/sec), even when the same pulse voltage VC of about 8300 pulses as applied in the case of the average speed is applied to the piezoelectric element 15, the lens 21 does not move beyond the position where the best focal length is about 17 cm (moving path M2). With the moving speed being Max (5.3 mm/sec), when the same pulse voltage VC of about 8300 pulses as applied in the case of the average speed is applied to the piezoelectric element 15, in calculation, the lens 21 moves beyond the position where the best focal length is 8 cm. Accordingly, the lens 21 stops at the position of the macro-side stopper 20 (moving path M3).

This causes a significant variation in lens position (variation V1). This variation in lens position is originated from the long distance from the starting point of the movement to the macro initial position, for the starting point of the movement to the macro initial position is the position of the infinity end stopper 19.

In the macro initial-position moving process of the camera 10 of the embodiment, however, because the starting point of the movement to the macro initial position is the position of the macro-side stopper 20, the distance from the starting point to the macro initial position is short. Even if the moving speed of the lens 21 fluctuates from Min (2.2 mm/sec) to Max (5.3 mm/sec), a variation in lens position is small.

Specifically, with the lens moving at the average speed, when the pulse voltage VC of about 2000 pulses, for example, is applied to the piezoelectric element 15, the lens 21 moves from the position of the macro-side stopper 20 to the macro initial position (the position where the best focal length is 10 cm) (moving path M4). With the moving speed being Min (2.2 mm/sec), when the same pulse voltage VC of about 2000 pulses as applied in the case of the average speed is applied to the piezoelectric element 15, the lens 21 moves to the position where the best focal length is about 9 cm (moving path M5). With the moving speed being Max (5.3 mm/sec), when the same pulse voltage VC of about 2000 pulses as applied in the case of the average speed is applied to the piezoelectric element 15, the lens 21 moves to the position where the best focal length is about 11 cm (moving path M6).

Therefore, the initial position falls within a range from the position where the best focal length is about 9 cm to the position where the best focal length is about 11 cm, resulting in a small variation (variation V2).

It is apparent that the embodiment can suppress a variation in the position of the lens 21 after movement.

The macro auto focus control process that is executed by the conventional camera will be explained next. FIG. 12 is a flowchart showing the process contents of the conventional macro auto focus control process.

First, the CPU 36 determines whether an operation of starting AF by the user has been detected (step S91). When the AF start operation is not detected (step S91: NO), the CPU 36 stands by until the operation is detected. As the user performs an operation of instructing the initiation of image capturing or AF, the CPU 36 detects the AF start operation (step S91: YES), and starts AF. In starting the AF, as done in step S81 in the conventional macro initial-position moving process (FIG. 11), the CPU 36 moves the lens 21 and the lens holder 18 to the infinity-end reference position to specify the lens position (step S92). Specifically, the CPU 36 moves the lens holder 18 at the macro initial position for the camera through to the infinity-end reference position. The CPU 36 waits for the passage of a predetermined time sufficient for the completion of the movement.

Thereafter, the CPU 36 moves the lens holder 18 to the end of the AF scan range in macro mode (step S93). Specifically, the CPU 36 sets the position of the end of the scan range with the infinity-end reference position taken as a reference, and moves the lens 21 and the lens holder 18 to the set position. The CPU 36 moves the lens 21 and the lens holder 18 to the infinity end of the AF scan range in macro mode from the infinity-end reference position in the macro direction. Because the starting point of the movement is the infinity-end reference position in the conventional macro auto focus control process, the lens holder 18 moves to the infinity end (the position where the best focal length becomes 20 cm) close to the infinity-end reference position in the scan range, and AF is started from that position.

Then, the CPU 36 sequentially moves the lens 21 and the lens holder 18 in the macro direction by predetermined distances within the scan range, and acquires images via the lens 21 and the imaging device 11 for the individual points to which the lens 21 and the lens holder 18 are moved. When the lens holder 18 moves to the macro-side end of the scan range, the CPU 36 detects a peak position based on the acquired image (step S94). Specifically, after the lens holder 18 moves to the AF end position in macro mode (the position where the best focal length becomes 10 cm), the CPU 36 detects a peak position which provides the best focus from image information acquired at the individual points.

Next, the CPU 36 determines whether detection of a peak position has been successful (step S95). When the detection of a peak position has been successful (step S95: YES), the CPU 36 moves the lens 21 and the lens holder 18 to the peak position (step S96), and displays the success of AF on the display unit 33 (step S97).

When the detection of a peak position has failed (step S95: NO), the CPU 36 moves the lens 21 and the lens holder 18 to the infinity-end reference position (step S98), and displays the failure of AF on the display unit 33 (step S99).

The above-described process is the macro auto focus control process that is executed by the conventional camera.

The conventional macro auto focus control process will be explained referring to an example of the moving path of the lens 21 shown in FIG. 14.

Figure 14:
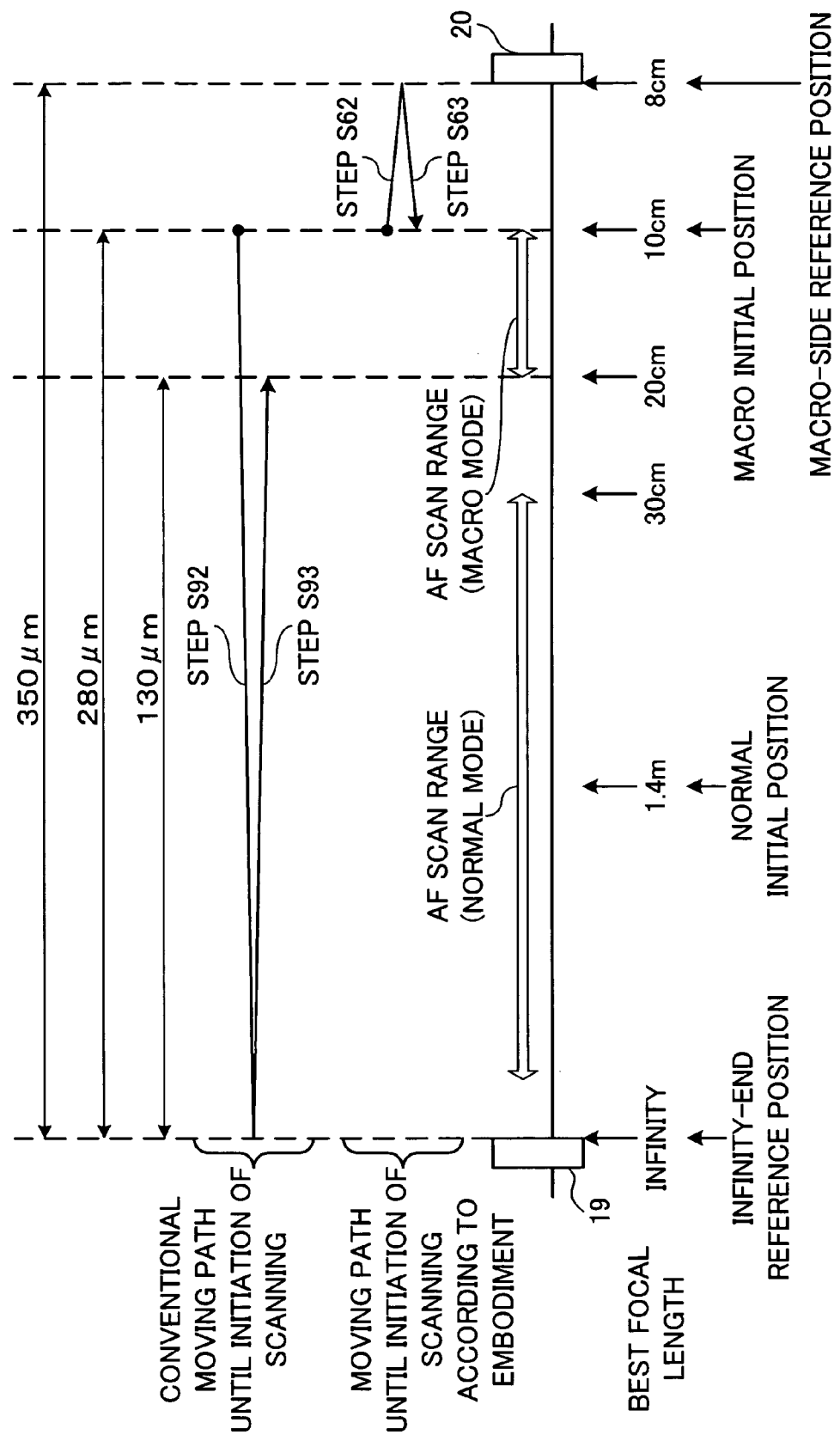
FIG. 14 is an explanatory diagram for an example of the movement path of the lens in the macro auto focus control process.
Figure 15:
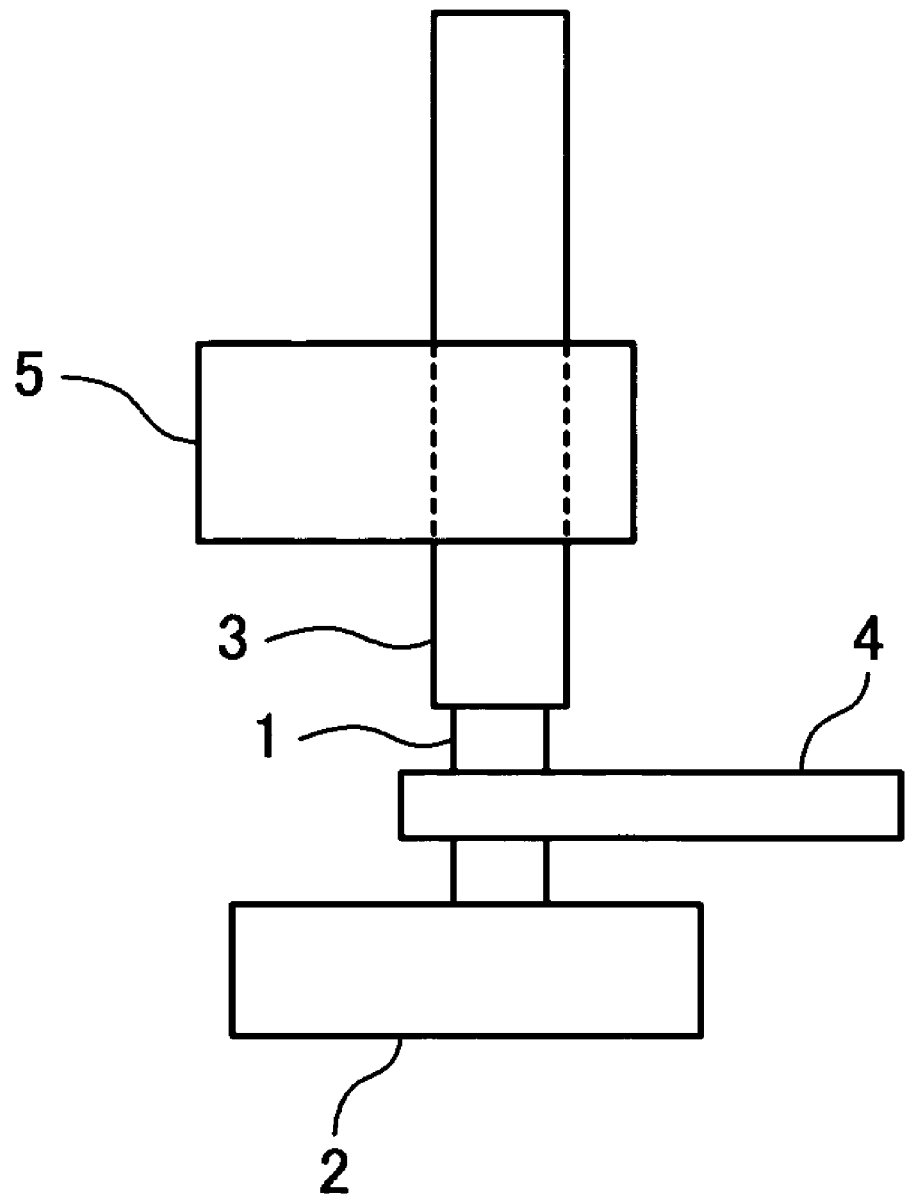
FIG. 15 is a diagram showing the main parts of an SIDM of a conventional camera.

As exemplified in FIG. 14, the AF scan range in macro mode is set from the position where the best focal length is 20 cm to the position where the best focal length is 10 cm. With the moving speed of the lens being the average of 3.75 mm/sec, when the pulse voltage VC of about 3900 pulses, for example, is applied to the piezoelectric element 15, the lens 21 moves to the infinity end of the scan range (the position where the best focal length is 20 cm) from the position of the infinity end stopper 19. In the case of the average speed, when the pulse voltage VC of about 8300 pulses, for example, is applied to the piezoelectric element 15, the lens 21 moves to the macro-side end of the scan range (the position where the best focal length is 10 cm) from the position of the infinity end stopper 19.

With the moving speed being Min (2.2 mm/sec), when the movement of the lens 21 is controlled with the same number of pulses as applied in the case of the average speed, the infinity end of the scan range comes to the position where the best focal length becomes about 33 cm, and the macro-side end of the scan range comes to the position where the best focal length becomes about 17 cm. With the moving speed being Max (5.3 mm/sec), the infinity end of the scan range comes to the position where the best focal length becomes about 15 cm, and the macro-side end of the scan range comes to the position where the best focal length becomes equal to or less than 8 cm in calculation, and thus comes to the position of the macro-side stopper 20. When the moving speed of the lens fluctuates this way, the scan range changes. For terminals (cellular phones) with different lens moving speeds, therefore, the focal distance in macro mode becomes different.

In the macro auto focus control process of the camera 10 of the embodiment, by way of contrast, the lens 21 moves with the position of the macro-side stopper 20 being a reference position. With the moving speed of the lens being the average of 3.75 mm/sec, when the pulse voltage VC of about 2000 pulses, for example, is applied to the piezoelectric element 15, the lens 21 moves to the macro-side end of the scan range (the position where the best focal length is 10 cm) from the position of the macro-side stopper 20. In the case of the average speed, when the pulse voltage VC of about 6500 pulses, for example, is applied to the piezoelectric element 15, the lens 21 moves to the infinity end of the scan range (the position where the best focal length is 20 cm) from the position of the macro-side stopper 20.

With the moving speed being Min (2.2 mm/sec), when the movement of the lens 21 is controlled with the same number of pulses as applied in the case of the average speed, the macro-side end of the scan range comes to the position where the best focal length becomes about 9 cm, and the infinity end of the scan range comes to the position where the best focal length becomes about 12 cm. With the moving speed being Max (5.3 mm/sec), the macro-side end of the scan range comes to the position where the best focal length becomes about 11 cm, and the infinity end of the scan range comes to the position where the best focal length becomes about 65 cm.

That is, in case where the pulse voltage VC to be applied has 2000 to 6500 pulses, when the moving speed of the lens fluctuates from Min to Max, the common scan range is restricted to the range between the position where the best focal length is 11 cm and the position where the best focal length is 12 cm. In this respect, the range of the number of pulses of the pulse voltage VC to be applied is increased so that even if the moving speed of the lens fluctuates, the range between the position where the best focal length is 10 cm and the position where the best focal length is 20 cm, which is set as the AF scan range in macro mode, becomes the common scan range.

Specifically, with the lens moving speed being Max, when the pulse voltage VC of 1400 pulses, for example, is applied to the piezoelectric element 15, the lens 21 moves to the macro-side end of the scan range (the position where the best focal length is 10 cm) from the position of the macro-side stopper 20. With the lens moving speed being Min, when the pulse voltage VC of 11000 pulses, for example, is applied to the piezoelectric element 15, the lens 21 moves to the infinity end of the scan range (the position where the best focal length is 20 cm) from the position of the macro-side stopper 20.

Accordingly, 1400 pulses are applied to the piezoelectric element 15 to move the lens 21 to the macro-side end of the scan range, and 11000 pulses are applied to the piezoelectric element 15 to move the lens 21 to the infinity end of the scan range.

When the lens moving speed is Min, therefore, AF is possible from the position where the best focal length is about 9 cm to the position where the best focal length is about 20 cm. When the lens moving speed is Max, therefore, AF is possible from the position where the best focal length is about 10 cm to the infinity end. Therefore, every terminal (cellular phone) can cover the desirable AF scan range from the position where the best focal length is 10 cm to the position where the best focal length is 20 cm in macro mode.

Further, the camera 10 of the embodiment has an advantage such that the time till the initiation of AF scanning is shorter.

In the conventional macro auto focus control process (FIG. 12), in response to the user's instruction to initiate image capturing or AF (step S91: YES), as shown in FIG. 14, the lens 21 moves 280 μm to the position of the infinity end stopper 19 from the macro initial position (step S92), then moves 130 μm to the position where the best focal length is 20 cm from the position of the infinity end stopper 19 (step S93), after which AF scanning starts. That is, the lens 21 moves 410 μm until AF scanning starts.

With the use of the camera 10 of the embodiment, by way of contrast, the lens 21 moves 70 μm to the position of the macro-side stopper 20 from the macro initial position (step S62 in FIG. 10), then moves 70 μm to the position where the best focal length is 10 cm from the position of the macro-side stopper 20 (step S63), after which AF scanning starts. That is, the moving distance of 140 μm of the lens 21 until the initiation of AF scanning is shorter than that of the conventional camera. Accordingly, in the AF of the camera 10 of the embodiment, the time till the initiation of AF scanning is shorter than that of the conventional camera.

The present invention is not limited to the foregoing embodiment, but can be modified in various other forms.

For example, the infinity-end reference position, the normal initial position, the macro initial position, and the macro-side reference position are not respectively limited to the position where the best focal length is the infinity end, the position where the best focal length is 1.4 m, the position where the best focal length is 10 cm, and the position where the best focal length is 8 cm, but may be set to other positions.

The foregoing description of the embodiment has been given of the case where the camera 10 is installed in a cellular phone. However, the camera 10 may be installed in other information processing apparatuses, such as a PDA (Personal Digital Assistant), a portable music player and an electronic wrist watch.

The foregoing description of the embodiment has been given on the premise that the program 341 to control the operation of the camera 10 is prestored in the memory 34 in the cellular phone equipped with the camera 10. The program to execute the above-described processes may be stored in a computer-readable recording medium, such as a flexible disk, a CD-ROM (Compact Disc Read-Only Memory), a DVD (Digital Versatile Disk), or an MO (Magneto-Optical disk), for distribution, and may be installed on a computer equipped with the camera 10 to realize an apparatus which executes the above-described processes.

The program may be stored beforehand in a disk device or the like of a server device present on a communication network, such as the Internet, and superimposed on, for example, a carrier wave, and downloaded to a computer. The above-described processes can be achieved by transferring the program over a communication network and executing the program.

When the above-described functions are partly executed by the OS (Operating System) or are realized by the cooperation of the OS and the application, for example, only the other part than the OS may be stored in a recording medium for distribution, or may be downloaded to a cellular phone.

Various embodiments and changes may be made thereunto without departing from the broad spirit and scope of the invention. The above-described embodiment is intended to illustrate the present invention, not to limit the scope of the present invention. The scope of the present invention is shown by the attached claims rather than the embodiment. Various modifications made within the meaning of an equivalent of the claims of the invention and within the claims are to be regarded to be in the scope of the present invention.

This application is based on Japanese Patent Application No. 2005-337885 filed on Nov. 22, 2005 and including specification, claims, drawings and summary. The disclosure of the above Japanese Patent Application is incorporated herein by reference in its entirety.

What is claimed is:

1. An imaging apparatus that picks up an image input via a lens, comprising:
    a moving unit that moves the lens along a drive shaft in a direction to make shorter a best focal length where a best focus is set to an imaging target and in a direction to make the best focal length longer;
    a first stopper that inhibits the lens from moving along the drive shaft in the direction to make the best focal length longer; and
    a second stopper that is located at a position apart from the first stopper and inhibits the lens present between the first stopper and the second stopper from moving in the direction to make the best focal length shorter, wherein the moving unit includes
        a first unit that sets a position to which the lens moves along the drive shaft with a position of the first stopper taken as a reference, and moves the lens from the position of the first stopper to the position set with the position of the first stopper taken as a reference; and
        a second unit that sets the position to which the lens moves along the drive shaft with a position of the second stopper taken as a reference, and moves the lens from the position of the second stopper to the position set with the position of the second stopper taken as a reference, and wherein
    the first unit and the second unit are switched from one to the other according to imaging modes.

2. The imaging apparatus according to claim 1, wherein the moving unit includes a piezoelectric element that is attached to an end portion of the drive shaft and stretches with a pulse applied to vibrate the drive shaft, thereby moving the lens.

3. The imaging apparatus according to claim 1, wherein the first stopper is arranged so as to stop the lens at a position which sets the best focal length at infinity.

4. The imaging apparatus according to claim 1, wherein the first unit moves the lens to the position of the first stopper from an initial lens position, sets the position of the lens with the position of the first stopper taken as a reference, and moves the lens from the position of the first stopper to the position set with the position of the first stopper taken as a reference, and
    the second unit moves the lens to the position of the second stopper from the initial lens position, sets the position of the lens with the position of the second stopper taken as a reference, and moves the lens from the position of the second stopper to the position set with the position of the second stopper taken as a reference.

5. The imaging apparatus according to claim 4, wherein the initial lens position is a lens position to execute a camera through to output the image input via the lens to a display unit.

6. The imaging apparatus according to claim 1, wherein
    the imaging modes include a first imaging mode and a second imaging mode, the second imaging mode ensuring closer imaging than the first imaging mode;
    the first unit sets a start position of auto focusing in the first imaging mode with the position of the first stopper taken as a reference, and moves the lens from the position of the first stopper to the start position of the auto focusing in the first imaging mode; and
    the second unit sets a start position of auto focusing in the second imaging mode with the position of the second stopper taken as a reference, and moves the lens from the position of the second stopper to the start position of the auto focusing in the second imaging mode.

* * * * *